US012626570B2

(12) United States Patent
Brault et al.

(10) Patent No.: US 12,626,570 B2
(45) Date of Patent: May 12, 2026

(54) SYSTEM FOR DISPLAYING NAVIGATION CONTROLS AND A PLURALITY OF VIDEO STREAMS AND METHOD OF USE THEREOF

(71) Applicant: GENETEC INC., St-Laurent (CA)

(72) Inventors: Mathieu Brault, Saint-Basile-le-Grand (CA); Sébastien Giroux, Sherbrooke (CA)

( * ) Notice: Subject to any disclaimer, the term of this patent is extended or adjusted under 35 U.S.C. 154(b) by 571 days.

(21) Appl. No.: 18/049,727

(22) Filed: Oct. 26, 2022

(65) Prior Publication Data

US 2024/0144797 A1 May 2, 2024

(51) Int. Cl.
*G08B 13/196* (2006.01)

(52) U.S. Cl.
CPC . *G08B 13/19693* (2013.01); *G08B 13/19645* (2013.01)

(58) Field of Classification Search
CPC .................... G08B 13/19693; G08B 13/19645
See application file for complete search history.

(56) References Cited

U.S. PATENT DOCUMENTS

| | | | |
|---|---|---|---|
| 5,473,745 A | 12/1995 | Berry et al. | |
| 6,108,003 A | 8/2000 | Hall, Jr. et al. | |
| 6,448,986 B1 | 9/2002 | Smith | |
| 7,219,308 B2 | 5/2007 | Novak et al. | |
| 7,853,889 B1 | 12/2010 | Yanchar et al. | |
| 8,453,056 B2 | 5/2013 | Gupta et al. | |
| 8,904,305 B2 | 12/2014 | Queru | |
| 9,268,875 B2 | 2/2016 | Campbell et al. | |
| 9,911,238 B2 | 3/2018 | Doronichev et al. | |
| 2006/0277478 A1 | 12/2006 | Seraji et al. | |
| 2014/0317556 A1 | 10/2014 | Ellenich et al. | |
| 2016/0314355 A1* | 10/2016 | Laska | G06F 3/048 |

OTHER PUBLICATIONS

"Zoom Meetings Control Bar". Retrieved Dec. 5, 2022 from the website: https://www.youtube.com/watch?v=JO-ozLEHBZQ.
Mark Jongeling, "Opening a Tile item directly as Pop-up screen". Retrieved Dec. 5, 2022 from the website: https://community.thinkwisesoftware.com/ideas/opening-a-tile-item-directly-as-pop-up-screen-208.

* cited by examiner

*Primary Examiner* — On S Mung
(74) *Attorney, Agent, or Firm* — Anglehart et al.

(57) ABSTRACT

A method for display of video stream navigation controls and video stream tiles on a graphical user interface; it includes rendering, on a display device of a computing device, a graphical user interface with two or more video stream tiles, each of the two or more video stream tiles adapted to display a video stream comprising a plurality of image frames; receiving, at the computing device, input for selecting a first video stream tile of the two or more video stream tiles, the first video stream tile having displayed therein a first video stream; and displaying navigation controls for controlling the display of the first video stream of the first video stream tile.

28 Claims, 11 Drawing Sheets

SYSTEM FOR DISPLAYING NAVIGATION CONTROLS AND A PLURALITY OF VIDEO STREAMS AND METHOD OF USE THEREOF

TECHNICAL FIELD

The present disclosure relates to relates to displaying video streams on a graphical user interface, and more particularly, to displaying navigation controls in conjunction with video streams on a graphical user interface.

BACKGROUND

Use of video cameras to monitor both private and public areas for security purposes is widespread. In some instances, there exists a need to view surveillance footage from multiple video surveillance cameras concurrently by security personnel in order to effectively monitor the areas under surveillance.

These multiple video streams may be displayed on the screen in a video stream tile format, where the space available on the display is shared amongst the displayed video streams. A video stream tile is a space of a graphical user interface allotted to viewing a video stream (a stream of images resulting in a video). The video stream tile may have a frame. The video stream tile may be associated with a plurality of navigation controls (such as those to play, pause, accelerate or decelerate playback of the video stream).

Sharing the space available on a display screen between a plurality of video streams results in spatial constraints, where certain compromises are required to display the video streams as well as their navigation controls (such as reduced resolution of the video streams, obscuring information presented on the display, etc.)

Therefore, when a user seeks to control playback of a particular video stream, the spatial constraints of the display with the plurality of video stream tiles create a challenge for displaying navigation controls used by the user for controlling playback of a video stream of interest.

SUMMARY

When a user requests to control navigation for a selected video stream appearing in the plurality of video stream tiles, the navigation controls are traditionally displayed over the video stream of interest, thereby resulting in the problem of obscuring some information provided by the video stream. This obscuring may result in the user missing some important details that would otherwise be visible in the video stream, and that may be critical for video surveillance purposes.

The present disclosure relates to a system and method of use thereof for displaying navigation controls for controlling viewing or playback of a video stream displayed in a video stream tile, appearing in a display displaying a graphical user interface with two or more video stream tiles.

The navigation controls are displayed in association with a specific video stream tile of interest, for receipt of input from a user selecting the video stream tile. The displaying of the navigation controls causes an overlap of the displayed navigation controls, or of the video stream tile of interest, and an adjacent video stream tile that is not the video tile of interest. This overlapping by the video stream tile of interest or its corresponding navigation controls may be with an adjacent video stream tile that is on top, below, to the left, or to the right, of the video stream tile of interest. As a result, the video stream of interest is not obscured by its own navigation controls, the navigation controls instead obscuring an adjacent video stream tile that is not of interest to the user.

A broad aspect is a method for display of video stream navigation controls and video stream tiles on a graphical user interface. The method includes rendering, on a display device of a computing device, a graphical user interface with two or more video stream tiles, each of the two or more video stream tiles adapted to display a video stream comprising a plurality of image frames; receiving, at the computing device, input for selecting a first video stream tile of the two or more video stream tiles, the first video stream tile having displayed therein a first video stream; and displaying, by the computing device on the graphical user interface, navigation controls for controlling the display of the first video stream of the first video stream tile based on receiving the input for selecting the first video stream tile, the navigation controls at least in part overlapping a second video stream tile of the two or more video stream tiles that is adjacent to the first video stream tile, the second video stream tile having displayed therein a second video stream.

In some embodiments, the navigation controls that at least in part overlap the second video stream tile may be at least in part transparent to allow for the second video stream of the second video stream tile to at least in part be visible within the navigation controls.

In some embodiments, the navigation controls that at least in part overlap the second video stream tile may be opaque to obscure a portion of the second video stream of the second video stream tile overlapped by the navigation controls.

In some embodiments, the navigation controls that at least in part overlap the second video stream tile may include a video timeline that overlaps the second video stream tile.

In some embodiments, the first video stream tile may be positioned above the second video stream tile, and wherein the navigation controls may overlap a top portion of the second video stream tile without obstructing the first video stream displayed within the first video stream tile.

In some embodiments, the first video stream tile may be positioned below the second video stream tile, and wherein the navigation controls may overlap a bottom portion of the second video stream tile without obstructing the first video stream displayed within the first video stream tile.

In some embodiments, the input may include hovering over the first video stream tile with a cursor of an input device.

In some embodiments, the input may include a button press selection of the first video stream tile via an input device.

In some embodiments, the video stream of each of the two or more video stream tiles may correspond to a respective video stream displayed by a respective surveillance camera.

In some embodiments, displaying the navigation controls may include overlaying the navigation controls over a portion of the first video stream tile; and shifting the navigation controls to the second stream tile to unobstruct the portion of the first video stream tile.

In some embodiments, overlaying the navigation controls may occur when the input includes hovering over the first video stream tile with a cursor of an input device and wherein shifting the navigation controls occurs when the input includes a button press selection of the first video stream tile with the input device.

In some embodiments, the input may be a first input, and wherein the method may include receiving a second input, at the computing device, to unselect the first video stream tile; and removing, by the computing device on the graphical user interface, the navigation controls that at least in part overlap the second video stream tile from overlapping the second video stream tile when the second input is received.

In some embodiments, the first video stream tile and the second video stream tile may be touching.

In some embodiments, each of the two or more video stream tiles may include base navigation controls, and wherein the navigation controls that are displayed may add to the base navigation controls of the first video stream tile.

In some embodiments, the two or more video stream tiles may include at least four video stream tiles arranged in a matrix of video stream tiles.

Another broad aspect is a method for display of video stream navigation controls and video stream tiles on a graphical user interface. The method includes rendering, on a display device of a computing device, a graphical user interface with two or more video stream tiles, each of the two or more video stream tiles adapted to display a video stream comprising a plurality of image frames; receiving, at the computing device, input for selecting a first video stream tile of the two or more video stream tiles, the first video stream tile having displayed within a first video stream; displaying, by the computing device on the graphical user interface, navigation controls for controlling the display of the first video stream of the first video stream tile based on receiving the input for selecting the first video stream tile; and displacing the first video stream tile to at least in part overlap a second video stream tile of the two or more video stream tiles that is adjacent to the first video stream tile, the second video stream tile having displayed within a second video stream, said displacing resulting in the navigation controls being displayed within a region of the graphical user interface previously occupied by the first video stream.

In some embodiments, the first video stream tile may be positioned below the second video stream tile, and wherein the first video stream tile may overlap a bottom portion of the second video stream tile following said displaying of the navigation controls, the navigation controls displayed over a bottom of the first video stream tile.

In some embodiments, the first video stream tile may be positioned above the second video stream tile, and wherein the first video stream tile may overlap a top portion of the second video stream tile following said displaying of the navigation controls, the navigation controls displayed next to a top of the first video stream tile.

In some embodiments, the navigation controls may include a video timeline.

In some embodiments, the input may include hovering over the first video stream tile with a cursor of an input device.

In some embodiments, the input may include a button press selection of the first video stream tile via an input device.

In some embodiments, the video stream of each of the two or more video stream tiles may correspond to a respective video stream generated by a respective surveillance camera.

In some embodiments, displaying the navigation controls may include overlaying the navigation controls over a portion of the first video stream tile; and shifting the first video stream tile over the second stream tile, the first video stream tile unobstructed by the navigation controls.

In some embodiments, overlaying the navigation controls may occur when the input includes hovering over the first video stream tile with a cursor of an input device and wherein shifting the navigation controls may occur when the input includes a button press selection of the first video stream tile with the input device.

In some embodiments, the input may be a first input, and the method may include receiving a second input, at the computing device, to unselect the first video stream tile; and removing, by the computing device on the graphical user interface, the navigation controls; and shifting the first video stream tile to unobstruct the second video stream tile.

In some embodiments, the first video stream tile and the second video stream tile may be touching.

In some embodiments, each of the two or more video stream tiles may include base navigation controls, and wherein the navigation controls that are displayed may add to the base navigation controls of the first video stream tile.

In some embodiments, the two or more video stream tiles may include at least four video stream tiles arranged in a matrix of video stream tiles.

Another broad aspect is a system for display of video stream navigation controls and video stream tiles on a graphical user interface. The system includes a processor; and memory further including program code that, when executed by the processor, causes the processor to render a graphical user interface with two or more video stream tiles, each of the two or more video stream tiles adapted to display a video stream comprising a plurality of image frames; receive input for selecting a first video stream tile of the two or more video stream tiles, the first video stream tile having displayed therein a first video stream; and display navigation controls for controlling the display of the first video stream of the first video stream tile based on receiving the input for selecting the first video stream tile, the navigation controls at least in part overlapping a second video stream tile of the two or more video stream tiles that is adjacent to the first video stream tile, the second video stream tile having displayed therein a second video stream.

In some embodiments, the navigation controls that at least in part overlap the second video stream tile may be at least in part transparent to allow for the second video stream of the second video stream tile to at least in part be visible within the navigation controls.

In some embodiments, the navigation controls that at least in part overlap the second video stream tile may be opaque to obscure a portion of the second video stream of the second video stream tile overlapped by the navigation controls.

In some embodiments, the navigation controls that at least in part overlap the second video stream tile may include a video timeline that overlaps the second video stream tile.

In some embodiments, the first video stream tile may be positioned above the second video stream tile, and wherein the navigation controls may overlap a top portion of the second video stream tile without obstructing the first video stream displayed within the first video stream tile.

In some embodiments, the first video stream tile may be positioned below the second video stream tile, and wherein the navigation controls may overlap a bottom portion of the second video stream tile without obstructing the first video stream displayed within the first video stream tile.

In some embodiments, the input may include hovering over the first video stream tile with a cursor of an input device.

In some embodiments, the input may include a button press selection of the first video stream tile via an input device.

In some embodiments, the video stream of each of the two or more video stream tiles may correspond to a respective video stream generated by a respective surveillance camera.

In some embodiments, the program code may further cause the processor to, when displaying the navigation controls, overlay the navigation controls over a portion of the first video stream tile; and shift the navigation controls to the second stream tile to unobstruct the portion of the first video stream tile.

In some embodiments, wherein overlaying the navigation controls may occur when the input includes hovering over the first video stream tile with a cursor of an input device and wherein shifting the navigation controls may occur when the input includes a button press selection of the first video stream tile with the input device.

In some embodiments, the input may be a first input, and the program code may further cause the processor to receive a second input to unselect the first video stream tile; and remove the navigation controls that at least in part overlap the second video stream tile from overlapping the second video stream tile when the second input is received.

In some embodiments, the first video stream tile and the second video stream tile may be touching.

In some embodiments, each of the two or more video stream tiles may include base navigation controls, and wherein the navigation controls that are displayed may add to the base navigation controls of the first video stream tile.

In some embodiments, the two or more video stream tiles may include at least four video stream tiles arranged in a matrix of video stream tiles.

Another broad aspect is a system for display of video stream navigation controls and video stream tiles on a graphical user interface. The system includes a processor; and memory further including program code that, when executed by the processor, causes the processor to render a graphical user interface with two or more video stream tiles, each of the two or more video stream tiles adapted to display a video stream comprising a plurality of image frames; receive input for selecting a first video stream tile of the two or more video stream tiles, the first video stream tile having displayed within a first video stream; display navigation controls for controlling the display of the first video stream of the first video stream tile based on receiving the input for selecting the first video stream tile; and displace the first video stream tile to at least in part overlap a second video stream tile of the two or more video stream tiles that is adjacent to the first video stream tile, the second video stream tile having displayed within a second video stream, said displacing resulting in the navigation controls being displayed within a region of the graphical user interface previously occupied by the first video stream.

In some embodiments, the first video stream tile may be positioned below the second video stream tile, and wherein the first video stream tile may overlap a bottom portion of the second video stream tile following said displaying of the navigation controls, the navigation controls displayed over a bottom of the first video stream tile.

In some embodiments, the first video stream tile may be positioned above the second video stream tile, and wherein the first video stream tile may overlap a top portion of the second video stream tile following said displaying of the navigation controls, the navigation controls displayed next to a top of the first video stream tile.

In some embodiments, the navigation may control include a video timeline.

In some embodiments, the input may include hovering over the first video stream tile with a cursor of an input device.

In some embodiments, the input may include a button press selection of the first video stream tile via an input device.

In some embodiments, the video stream of each of the two or more video stream tiles may correspond to a respective video stream generated by a respective surveillance camera.

In some embodiments, the program code may further cause the processor to, when displaying the navigation controls, overlay the navigation controls over a portion of the first video stream tile; and shift the first video stream tile over the second stream tile, the first video stream tile unobstructed by the navigation controls.

In some embodiments, where overlaying the navigation controls may occur when the input includes hovering over the first video stream tile with a cursor of an input device and wherein shifting the navigation controls may occur when the input may include a button press selection of the first video stream tile with the input device.

In some embodiments, where the input may be a first input, and the program code may further cause the processor to receive a second input to unselect the first video stream tile; remove the navigation controls; and shift the first video stream tile to unobstruct the second video stream tile.

In some embodiments, the first video stream tile and the second video stream tile may be touching.

In some embodiments, each of the two or more video stream tiles may include base navigation controls, and wherein the navigation controls that are displayed may add to the base navigation controls of the first video stream tile.

In some embodiments, the two or more video stream tiles may include at least four video stream tiles arranged in a matrix of video stream tiles.

Another broad aspect is a non-transitory computer-readable medium having stored thereon program instructions for display of video stream navigation controls and video stream tiles on a graphical user interface, the program instructions executable by a processing unit for rendering a graphical user interface with two or more video stream tiles, each of the two or more video stream tiles adapted to display a video stream comprising a plurality of image frames; receiving input for selecting a first video stream tile of the two or more video stream tiles, the first video stream tile having displayed therein a first video stream; and displaying navigation controls for controlling the display of the first video stream of the first video stream tile based on receiving the input for selecting the first video stream tile, the navigation controls at least in part overlapping a second video stream tile of the two or more video stream tiles that is adjacent to the first video stream tile, the second video stream tile having displayed therein a second video stream.

In some embodiments, the navigation controls that at least in part overlap the second video stream tile may be at least in part transparent to allow for the second video stream of the second video stream tile to at least in part be visible within the navigation controls.

In some embodiments, the navigation controls that at least in part overlap the second video stream tile may be opaque to obscure a portion of the second video stream of the second video stream tile overlapped by the navigation controls.

In some embodiments, the navigation controls that at least in part overlap the second video stream tile may include a video timeline that overlaps the second video stream tile.

In some embodiments, the first video stream tile may be positioned above the second video stream tile, and wherein the navigation controls may overlap a top portion of the second video stream tile without obstructing the first video stream displayed within the first video stream tile.

In some embodiments, the first video stream tile may be positioned below the second video stream tile, and wherein the navigation controls may overlap a bottom portion of the second video stream tile without obstructing the first video stream displayed within the first video stream tile.

In some embodiments, the input may include hovering over the first video stream tile with a cursor of an input device.

In some embodiments, the input may include a button press selection of the first video stream tile via an input device.

In some embodiments, the video stream of each of the two or more video stream tiles may correspond to a respective video stream generated by a respective surveillance camera.

In some embodiments, the program instructions may further cause the processing unit to, when displaying the navigation controls, overlay the navigation controls over a portion of the first video stream tile; and shift the navigation controls to the second stream tile to unobstruct the portion of the first video stream tile.

In some embodiments, wherein overlaying the navigation controls may occur when the input includes hovering over the first video stream tile with a cursor of an input device and wherein shifting the navigation controls may occur when the input includes a button press selection of the first video stream tile with the input device.

In some embodiments, the input may be a first input, and the program instructions may further cause the processing unit to receive a second input to unselect the first video stream tile; and remove the navigation controls that at least in part overlap the second video stream tile from overlapping the second video stream tile when the second input is received.

In some embodiments, the first video stream tile and the second video stream tile may be touching.

In some embodiments, each of the two or more video stream tiles may include base navigation controls, and wherein the navigation controls that are displayed may add to the base navigation controls of the first video stream tile.

In some embodiments, the two or more video stream tiles may include at least four video stream tiles arranged in a matrix of video stream tiles.

Another broad aspect is a non-transitory computer-readable medium having stored thereon program instructions for display of video stream navigation controls and video stream tiles on a graphical user interface, the program instructions executable by a processing unit for rendering a graphical user interface with two or more video stream tiles, each of the two or more video stream tiles adapted to display a video stream comprising a plurality of image frames; receiving input for selecting a first video stream tile of the two or more video stream tiles, the first video stream tile having displayed within a first video stream; displaying navigation controls for controlling the display of the first video stream of the first video stream tile based on receiving the input for selecting the first video stream tile; and displacing the first video stream tile to at least in part overlap a second video stream tile of the two or more video stream tiles that is adjacent to the first video stream tile, the second video stream tile having displayed within a second video stream, said displacing resulting in the navigation controls being displayed within a region of the graphical user interface previously occupied by the first video stream.

In some embodiments, the first video stream tile may be positioned below the second video stream tile, and wherein the first video stream tile may overlap a bottom portion of the second video stream tile following said displaying of the navigation controls, the navigation controls displayed over a bottom of the first video stream tile.

In some embodiments, the first video stream tile may be positioned above the second video stream tile, and wherein the first video stream tile may overlap a top portion of the second video stream tile following said displaying of the navigation controls, the navigation controls displayed next to a top of the first video stream tile.

In some embodiments, the navigation may control include a video timeline.

In some embodiments, the input may include hovering over the first video stream tile with a cursor of an input device.

In some embodiments, the input may include a button press selection of the first video stream tile via an input device.

In some embodiments, the video stream of each of the two or more video stream tiles may correspond to a respective video stream generated by a respective surveillance camera.

In some embodiments, the program instructions may further cause the processing unit to, when displaying the navigation controls, overlay the navigation controls over a portion of the first video stream tile; and shift the first video stream tile over the second stream tile, the first video stream tile unobstructed by the navigation controls.

In some embodiments, where overlaying the navigation controls may occur when the input includes hovering over the first video stream tile with a cursor of an input device and wherein shifting the navigation controls may occur when the input may include a button press selection of the first video stream tile with the input device.

In some embodiments, where the input may be a first input, and the program instructions may further cause the processing unit to receive a second input to unselect the first video stream tile; remove the navigation controls; and shift the first video stream tile to unobstruct the second video stream tile.

In some embodiments, the first video stream tile and the second video stream tile may be touching.

In some embodiments, each of the two or more video stream tiles may include base navigation controls, and wherein the navigation controls that are displayed may add to the base navigation controls of the first video stream tile.

In some embodiments, the two or more video stream tiles may include at least four video stream tiles arranged in a matrix of video stream tiles.

BRIEF DESCRIPTION OF THE DRAWINGS

The invention will be better understood by way of the following detailed description of embodiments of the invention with reference to the appended drawings, in which.

DETAILED DESCRIPTION

Figure 1:
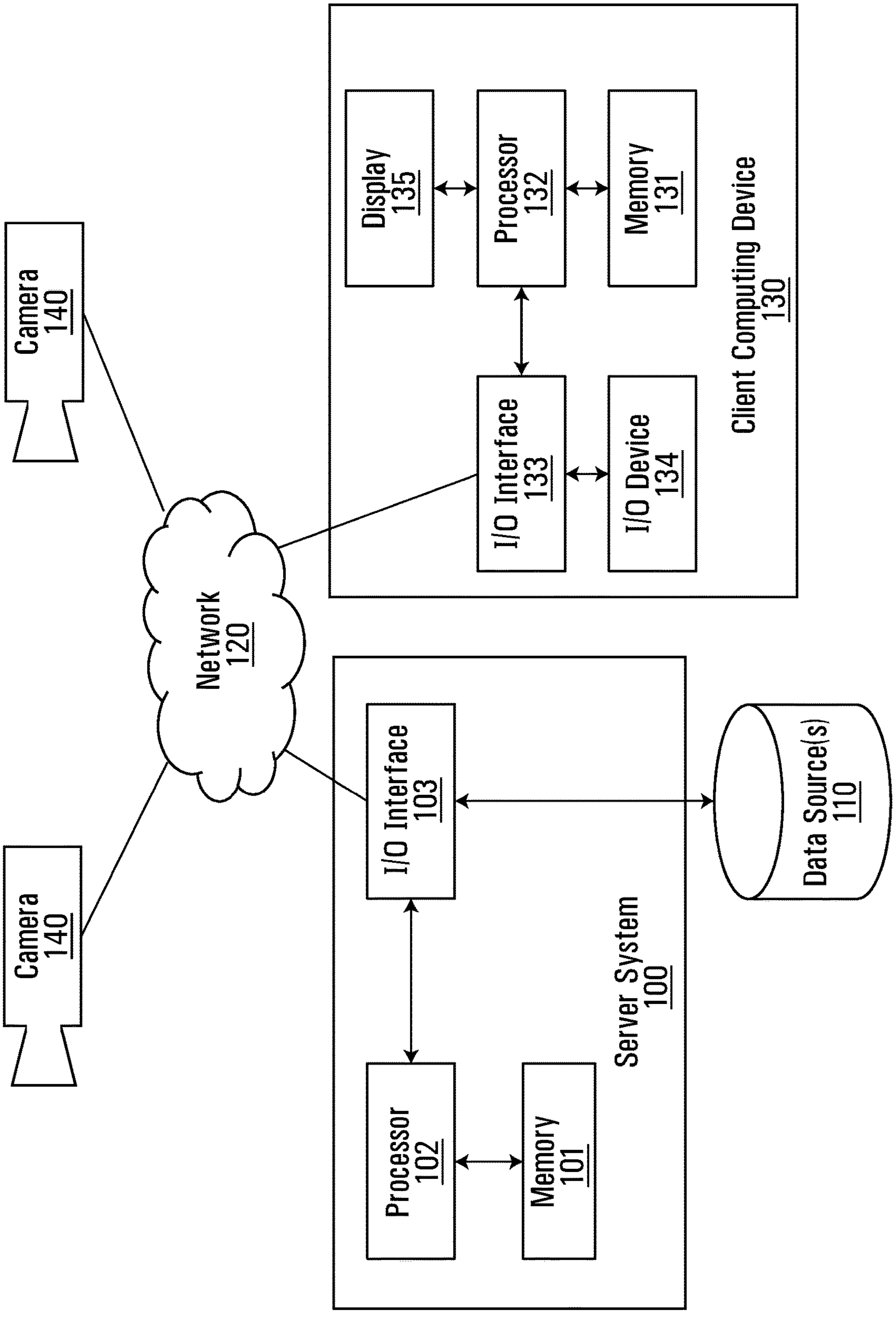
FIG. 1 is a block diagram of an exemplary system for managing the display of a plurality of video streams in a respective plurality of video stream tiles appearing in a graphical user interface displayed on a display.

The present disclosure relates to methods and systems for displaying navigation controls for controlling a video stream appearing in a video stream tile displayed as one of a plurality of video stream tiles, each video stream tile of the plurality of video streams for displaying a video stream.

A problem with current displays for multiple video streams is the display of navigation controls for a video stream of interest over the video stream of interest due to the spatial constraints resulting from viewing multiple video streams simultaneously. Despite the display of the navigation controls enabling a user to navigate through the video stream, the display of the navigation controls hinders viewing of a portion of the video stream itself, the navigation controls covering a portion of the video stream. Instead, the methods and systems of the present disclosure describe a display where the navigation controls of the video stream of interest obscure an adjacent video stream tile to the selected video stream tile of the video stream of interest, as described herein.

Following a selection of one video stream tile of a plurality of video stream tiles displayed on the graphical user interface appearing on the display of the computing device, navigation controls for that selected video stream tile are displayed. The displayed navigation controls or the selected video stream tile overlaps an adjacent video stream tile of the selected video stream tile, such that a video feed of the selected video stream tile and the displayed navigation controls are viewable on the graphical user interface, positioned over the space occupied by an adjacent video stream tile that has not been selected by a user. The overlapping with an adjacent video stream tile enables a display to a user of the video stream shown in the selected video stream tile, while permitting navigation of the video stream located in the selected video stream tile using the navigation controls. As such, the video feed of the selected video stream tile is not, or at least less, obstructed by its own navigation controls, despite the space limitations imposed by a layout of video stream tiles showing a plurality of video streams displayed simultaneously on a graphical user interface. This aforementioned aspect of the present disclosure and others are further described herein.

An adjacent video stream tile is a video stream tile that is neighbouring one side (i.e. top, bottom, left, right) of the selected video stream tile. The adjacent video stream tile may be touching a border of the selected video stream tile. The adjacent video stream tile is next to the selected video stream tile.

The present systems and methods may be used in the context of video surveillance, where video feeds are being provided by a plurality of surveillance cameras. The video feeds may be displayed in real-time, or may be recorded videos that are played back.

Exemplary System for Displaying Video Streams:

For purposes of illustration, the exemplary systems and methods described herein will be described with respect to a video surveillance network. However, it will be understood that the present systems and methods are not limited to video surveillance, as explained herein.

Reference will now be made to FIG. 1, illustrating an exemplary environment of a system for causing a display of video streams 100. The system 100 is in communication, via a network 120 (e.g. Internet, LAN network, etc.) with one or more client computing devices 130. In some embodiments, the server system 100 may also be in communication with one or more cameras 140, each displaying a video stream. The server system 100 may also be in communication with one or more data sources 110 (e.g. for storing video streams; IP address information of the one or more cameras 140, the one or more client computing device 130, etc.)

The system 100 has at least one processor 102, memory 101 and at least one input/output interface 103 for communication with the one or more data sources 110, the one or more cameras 140, and/or an input/output interface 133 of the client computing device 130.

The one or more data sources 110 may be one or more external database(s), one or more external systems, for example, having one or more databases, that are accessibly via Application Programming Interface (API) calls, and/or one or more local databases that are part of the system 100.

The system 100 may have an interface 103 for each of the data sources 110. A separate I/O interface 103 may also be provided in system 100 for communicating with the I/O interface 133 of the client device 130. A separate I/O interface 103 may also be provided in system 100 for communicating with the one or more cameras 140.

The processor 102 may be a general-purpose programmable processor. In this example, the processor 102 is shown as being unitary, but the processor 102 may also be multicore, or distributed (e.g. a multi-processor).

The computer readable memory 101 stores program instructions and data used by the processor 102. The computer readable memory 101 may also store local occurrence records, data on the trigger-based rules, acting as a local database. The memory 101 may also store information regarding the data source(s) 110 that are accessible by the system 100, such as the identity of the data sources, a list of navigation controls, a configuration of navigation controls, etc. The memory 101 may be non-transitory. The computer readable memory 101, though shown as unitary for simplicity in the present example, may comprise multiple memory modules and/or caching. In particular, it may comprise several layers of memory such as a hard drive, external drive (e.g. SD card storage) or the like and a faster and smaller RAM module. The RAM module may store data and/or program code currently being, recently being or soon to be processed by the processor 102 as well as cache data and/or program code from a hard drive. A hard drive may store program code and be accessed to retrieve such code for execution by the processor 102 and may be accessed by the processor 102 to store and access data. The memory 101 may have a recycling architecture for storing, for instance, retrieved video stream data, where older data files are deleted when the memory 101 is full or near being full, or after the older data files have been stored in memory 101 for a certain time.

The I/O interface 103 is in communication with the processor 102. The I/O interface 103 may include a network interface and may be a wired or wireless interface for establishing a remote connection with, for example, a remote server, an external data source 110, the client computing device 200, a camera 140, etc. For instance, the I/O interface 103 may be an Ethernet port, a WAN port, a TCP port, etc.

The processor 102, the memory 101 and the I/O interfaces 103 may be linked via bus connections.

The data source(s) 110 may be one or more remote server(s) including one or more databases. A data source 110, and in particular a database, may contain video streams, including metadata on the respective video stream, IP addresses for different cameras associated with the system 100, IP addresses for client computing device 130, restrictions and/or access permissions for one or more of the client computing devices 130 (to e.g. video streams), navigation control designs, etc.

In some examples, the system 100 may have a local database stored, e.g., in memory 101, that contains a list of navigation controls, etc.

The client device 130 may be a remote computing device (i.e. client). The client device 130 is in communication with the I/O interface 103 of the system 100. The computing device 130 has a processor 132, a memory 131, an I/O interface 133 that may be linked via bus connections. The computing device 130 may have (or be connect to) any suitable I/O device(s) 134, for example, such as a keyboard, a mouse, a touchscreen etc. The computing device 130 may be a desktop computer, a laptop, a smartphone, a tablet, etc. The computing device 130 has (or is connect to) a display 135 (e.g. a screen, a tactile display, etc.). The processor 132, the memory 131 and the I/O interface(s) 133 may be similar to the processor 102, the memory 101 and the I/O interface(s) 103, respectively. There may be more than one client computing device 130 in communication with the server system 100. The client computing device 130 may also have one or more cameras (e.g. webcams).

A client application program may be stored in memory of the computing device 130 that is associated with the system 100, the client application program providing the user with an interface to interact with the system 100. The client application program may display the two or more video stream tiles on the display 135 of the client computing device 130, the two or more video stream tiles displaying the respective two or more video streams, and for displaying navigation controls when a selection of a video stream tile amongst the plurality of video stream tiles (e.g. through user input provided through the I/O device 134) is performed. In some instances, the client application program may be a web browser, a web application, a video surveillance or security program for displaying security footage, etc.

In some instances, the client application program may receive the video streams directly from the camera(s) 140, from the server system 100 acting as an intermediary or another intermediary, the data source(s) 110, etc., over the network 120.

In some embodiments, the system 100 may include at least one computing device 130, where, for instance, the connection between the system 100 and the computing device 130 may be a wired connection or a wireless connection. In some embodiments, the functionality of the system 100 and the client device 130 may be implemented on a single computing device.

Figure 3:
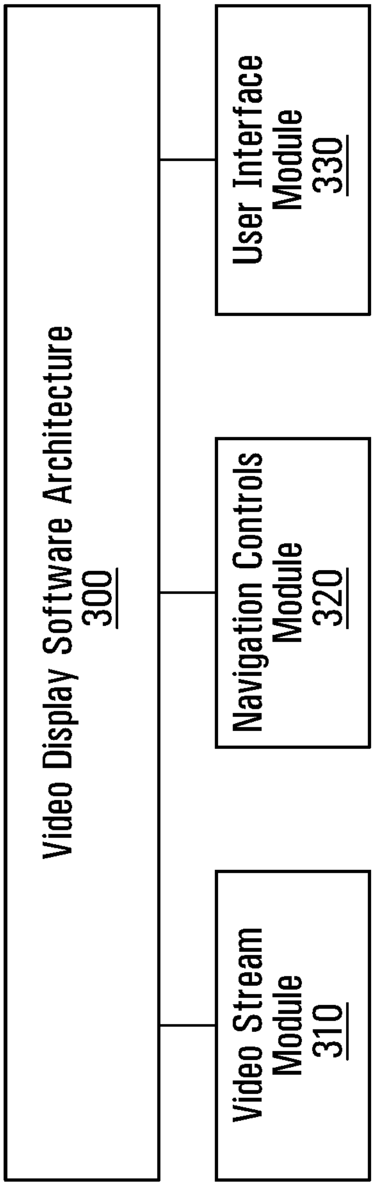
FIG. 3 is a block diagram of exemplary video display software architecture.

Exemplary Video Display Software Architecture:

Reference is now made to FIG. 3, illustrating exemplary video display software architecture 300 of the system 100 and the client computing device 130.

The system 100 has program code, stored in memory 101, that includes a video stream module 310. The computing device 130 has program code, stored in memory 131, that includes a navigation controls module 320 and a user interface module 330. Each of the video stream module 310, the navigation controls module 320 and the user interface module 330 includes program code configured to implement the functionality of the modules as is described herein. In some embodiments, the video stream module 310, the navigation controls module 320 and the user interface module 330 may be on a single computing device.

The user interface module 330 provides a graphical user interface (GUI) in the client device 130. The GUI is adapted to display two or more video streams in two or more respective video stream tiles (e.g. positioned in a matrix configuration). The GUI is also adapted to display navigation controls for controlling viewing of a video stream. The navigation controls may include, for instance, a "play" icon, a "pause" or "stop" icon, a "speed-up" button, a video progress indicator (which can be a video timeline, a numeric clock showing a progress time of the video, etc.)

The video stream module 310 includes program code that, when executed by the processor 102, causes the processor 102 to optionally receive a video stream from one or more cameras 140, or from one or more computing devices 120 (e.g. in the case of video streams being of gameplay of a user performed on the computing device 120, through, e.g., a share-screen function, or a webcam), or optionally retrieve a video stream from memory 101 or from the one or more data sources 110. The video stream module 310 may also include program code that, when executed by the processor 102, causes the processor 102 to cause the display of the video stream tiles on the graphical user interface appearing on the display 135 of the client computing device 130. The video stream module 310 includes program code that, when executed by the processor 102, causes the processor 102 to populate the video tiles of the graphical user interface appearing on the display 135 of the client computing device 130 with the respective video streams that have been received or retrieved. The video stream module 310 may cause an association between a specific video stream tile and a specific video stream, such that the video streams appear in a given configuration on the graphical user interface displayed on the display 135 of the client computing device 130.

The navigations controls module 320 includes program code that, when executed by the processor 132, causes the processor 132 to receiving input at the client computing device 130 (e.g. through I/O device 134) to select one of the video stream tiles displayed on the graphical user interface appearing on the display 135. The navigations control module 320 further includes program code that, when executed by the processor 132, causes the processor 132 to display commands, for displaying navigation controls associated with the selected video stream tile. The navigations control module 320 further includes program code that, when executed by the processor 132, causes the processor 132 to display commands for causing the computing device 130 to overlap a part of the selected video stream tile or the corresponding navigation controls over a portion of an adjacent video stream tile that has not been selected via input from the user.

It will be understood that the video stream tile module 310 may instead be executed by the processor 132 of the client computing device 130 (e.g. being part of the client application program running on, or accessed by, the client computing device 130 that displays the layout of the graphical user interface displaying the video stream tiles).

Figure 10:
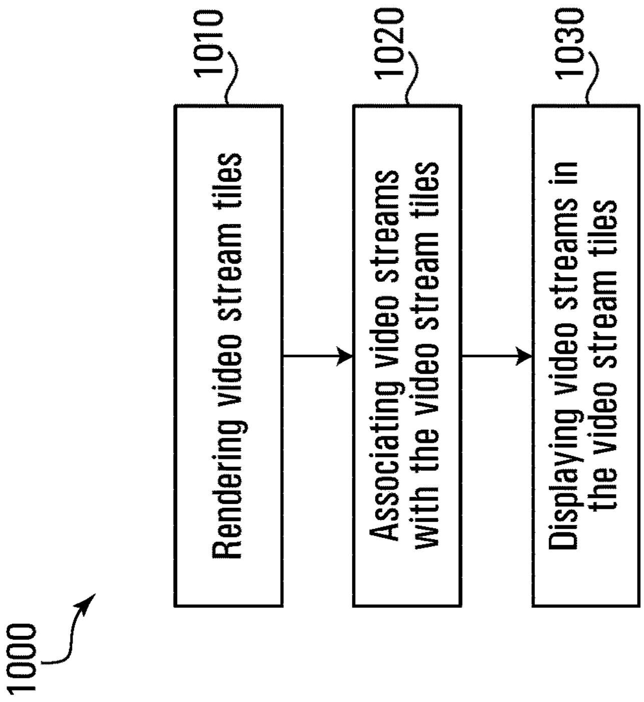
FIG. 10 is a flowchart diagram of an exemplary method for displaying video streams in two or more video stream tiles displayed on a graphical user interface.

Exemplary Method of Displaying Video Stream Tiles with Corresponding Video Streams:

Reference is now made to FIG. 10, illustrating an exemplary method 1000 of causing a display of video stream tiles on a graphical user interface by a system for managing display of video streams.

A command is issued to cause the rendering of video stream tiles on the graphical user interface appearing on a display of a computing device (e.g. a client computing device) at step 1010. The number of video stream tiles may vary, depending on the number of video streams that may be displayed concurrently on the graphical user interface. For instance, the graphical user interface may display 2, 4, 6, 10, etc. video stream tiles.

The video stream tiles may be laid out in a matrix configuration, where the number of video stream tiles in one axis (e.g. x axis or y axis) may be equal or different from the number of video stream tiles in the other axis. However, it will be understood that other layouts of video stream tiles may be contemplated without departing from the present teachings. For instance, in one embodiment, a plurality of video stream tiles may surround a central panel portion displayed on the graphical user interface, the central panel portion providing information to the user, such as general information relating to the displayed two or more video streams. Such information may include, but is not limited to, the current time, the number of video streams being displayed, the identity and credentials of the user viewing the two or more video streams, etc.

The video stream tiles may be positioned with respect to one another such that the video stream tiles are touching, or where there is space left between each of the video stream tiles.

Figure 4:
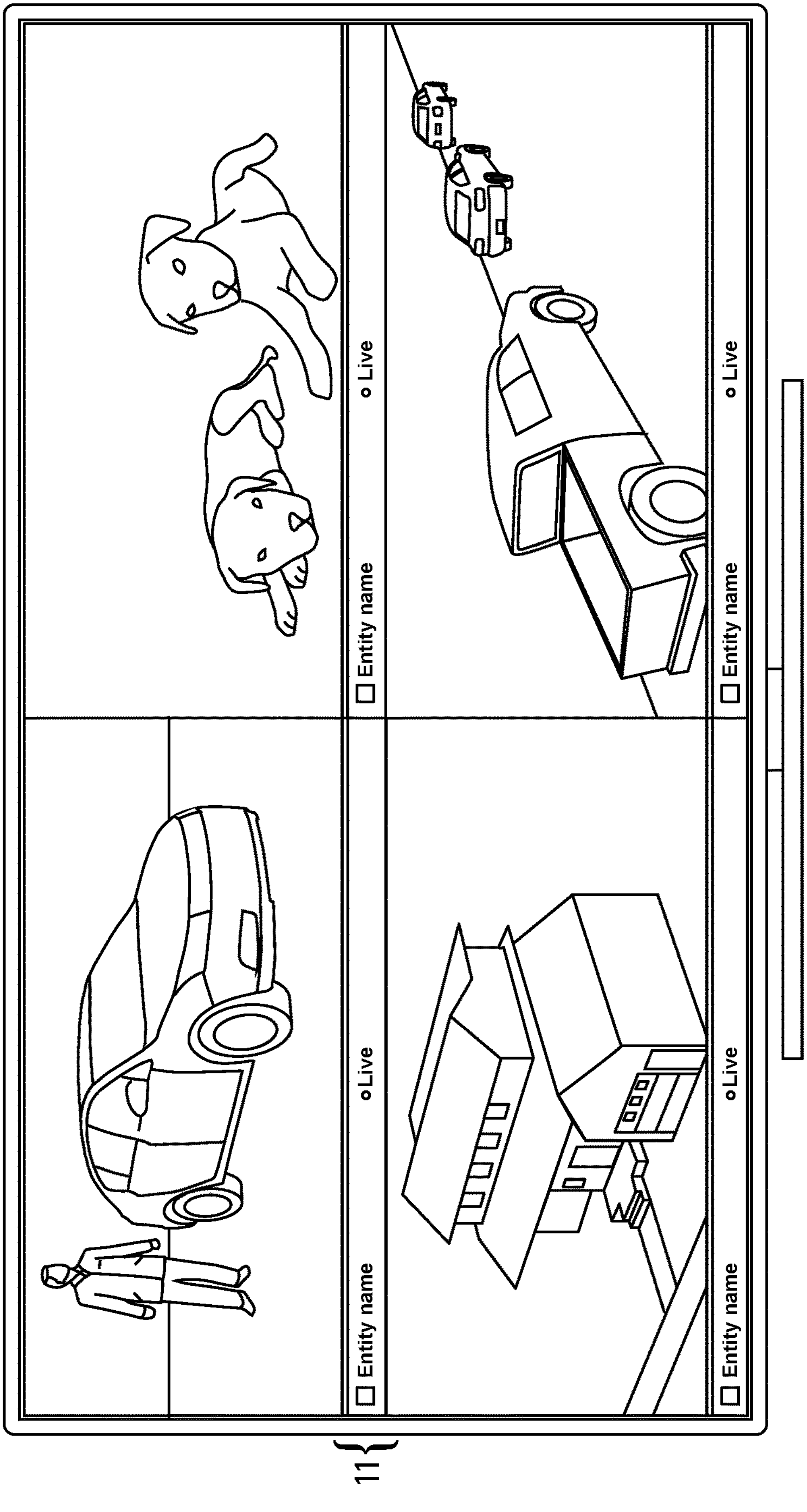
FIG. 4 is a drawing of an exemplary graphical user interface showing four video stream tiles, in a first phase.

Each of the video stream tiles may include base navigation controls 11 (as shown in FIG. 4), which may include visual indicators for providing information to the user as to the progress of the video. For instance, the video stream tile includes a bar showing the progress of the video stream. Other information that can be available in the base navigation controls 11 can be an indicator providing information on if the video feed is provided "live", in real-time, or a name or code associated with the video stream or the video stream tile, for identifying the video stream or the video stream tile. In other embodiments, each or some of the video stream tiles may not include base navigation controls.

Each video stream of two or more video streams are then caused to be associated with a video stream tile of the two or more video stream tiles at step 1020. Each video stream tile may be identified using the video stream tile position within a matrix of video stream tiles (e.g. defined by its x and y position within the matrix of video stream tiles). An association between an address (e.g. IP address) of a given camera or external computer that is the source of the video stream may be related to a specific video stream tile, such that the video feed from a given source is displayed in the corresponding video stream tile. The video streams that are displayed in the video stream tiles may be a combination of playing or paused videos streams.

The two or more video streams are then displayed for viewing in the graphical user interface rendering the two or more video stream tiles, at step 1030. Each video stream is displayed in its respective video stream tile. In some instances. the video streams may be playing the video streams in real-time, the video feed representing what is being captured by the video feed source (i.e. the camera). In some instances, the video streams may correspond to pre-recorded video streams (e.g. and stored in external data source 110) that are retrieved from memory and played back for viewing in a video stream tile. In some embodiments, the two or more video stream tiles may correspond to a mixture of video streams played in real-time and other recorded video streams that are played back.

Figure 11:
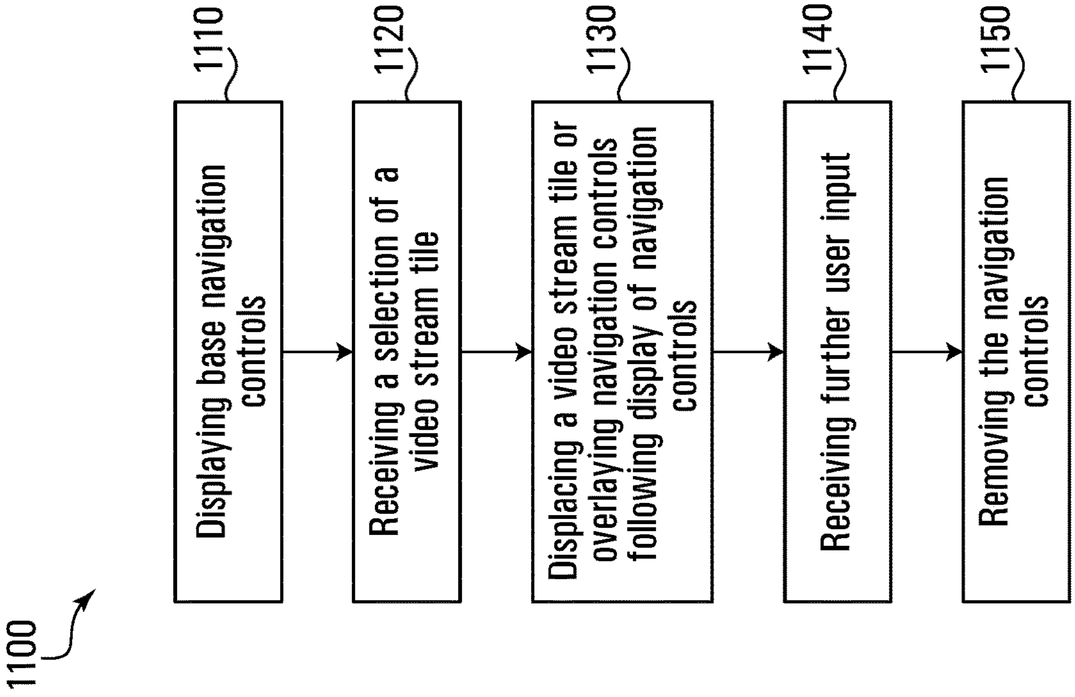
FIG. 11 is a flowchart diagram of an exemplary method for displaying navigation controls for controlling a video stream appearing in a selected video stream tile displayed on a graphical user interface.

Exemplary Method for Displaying Navigation Controls for Controlling a Video Stream Displayed in a Selected Video Stream Tile:

Reference is now made to FIG. 11, illustrating an exemplary method 1100 for displaying navigation controls for controlling a video stream displayed in a selected video stream tile of two or more video stream tiles. The video streams and video stream tiles may be displayed as described with respect to FIG. 10.

As explained with respect to FIG. 10, in some instances, each of the video stream tiles may include base navigation controls (e.g. base navigation controls 11 of FIG. 4) at step 1110. In some cases, where no base navigation controls are presented as part of the graphical user interface, step 1110 is omitted.

Input is then received from the user to select one of the video stream tiles of the two or more video stream tiles at step 1120 (e.g. one of the video stream tiles as illustrated at FIG. 4). The user input may be provided using one or more I/O devices, such as a mouse, a touchscreen, a keyboard, a microphone, a motion sensor, etc. The user input may include, but is not limited to, a button-press of a mouse, a button-press of a keyboard, a press on a touchscreen, a voice command captured by a microphone (e.g. identifying a name of identifier of a video stream tile), a motion captured by a motion sensor leading to a selection of a video stream tile, eye motion captured by a vision tracker directed towards the selected video stream tile, or a combination thereof. In some instances, the user input may be moving a cursor over, or hovering over, the selected video stream tile (that will cause the displaying of the navigation controls of the selected video stream tile).

In some instances, the display of navigation controls in association with a specific video stream tile may be triggered without the receipt of user input. For instance, instead of user input, the display of navigation controls may be triggered by a detection of an event associated with the video stream. For instance, the event may be defined through information provided along with the video stream, or received separately from the video feed, but associated with the video stream by, e.g., server system 100. For instance, the event may be an emergency call (e.g. 911 call) with a given timestamp and associated with a specific geographic position. A video stream tile, at a time corresponding with the given timestamp, displaying a video stream generated by a camera with a position within a vicinity to the geographic position corresponding to emergency call, may be selected by the system, as these conditions (time and location-related) have been met by the video stream displayed in the selected video stream tile. Navigation controls for the identified video stream tile are then displayed without receiving any user input. It will be understood that even though an emergency call is used herein as an example of an event that can trigger a selection of a video stream tile by the system, other events, and conditions associated with the event for selecting one or more appropriate video stream tiles, may also be contemplated without departing from the present teachings.

Figure 5A:
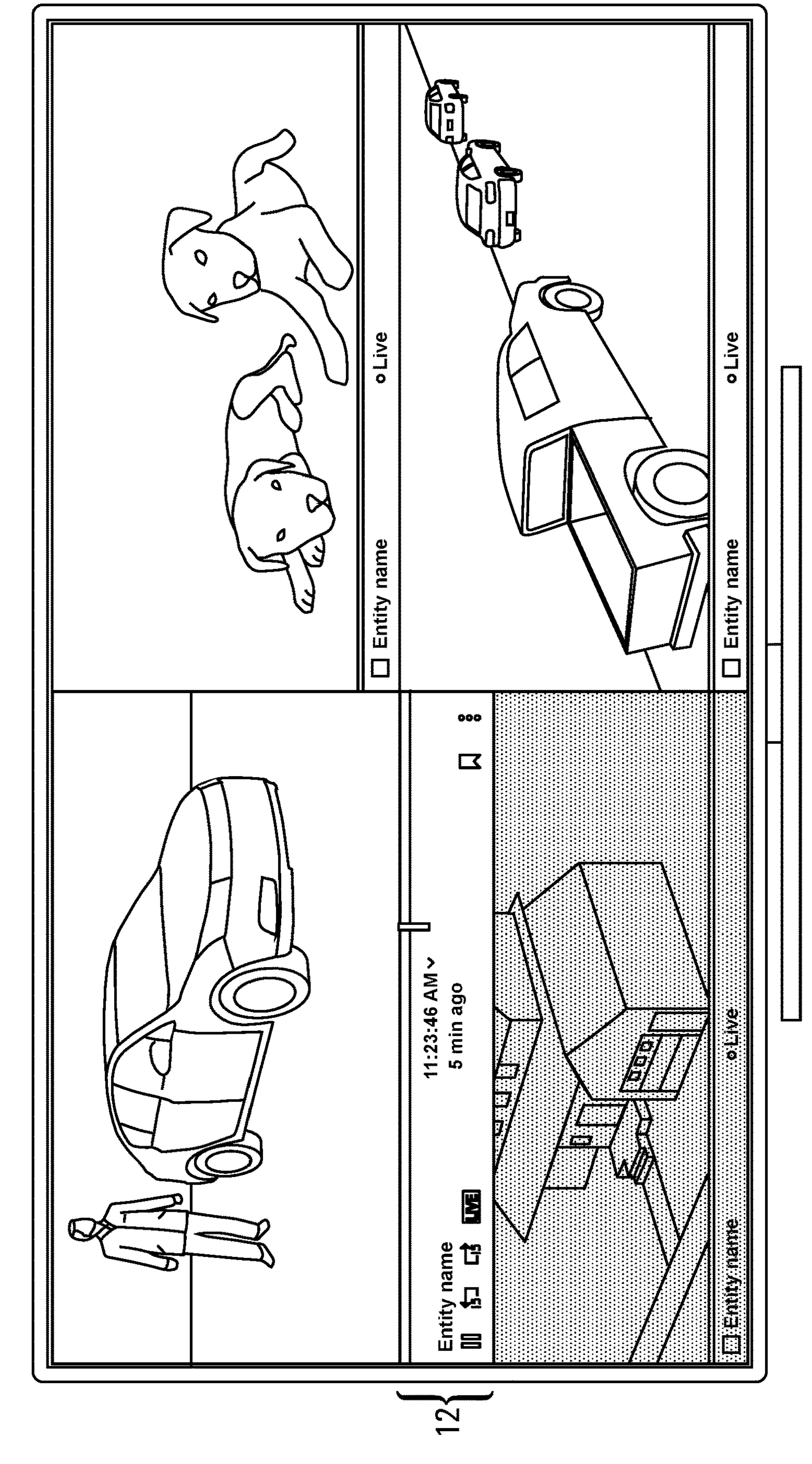
FIG. 5A is a drawing of an exemplary graphical user interface showing four video stream tiles, in a second phase following the first phase illustrated in FIG. 4.

The navigation controls corresponding to the selected video stream tile are displayed at step 1130. The displayed navigation controls are for controlling of the video stream displayed in the selected video stream tile, and for monitoring a progress of the video stream displayed in the displayed video stream tile. In some examples, the navigation controls add to the base navigation controls displayed in association with each video stream tile (e.g. base navigation controls 11). Exemplary navigation controls displayed at step 1130 are shown in FIG. 5A (displayed navigation controls 12). The displayed navigation controls may include, but are not limited to, one or more buttons for controlling the viewing or progress of the video stream displayed in the selected video stream tile, such as a "pause" or "stop" button, a "play" button, an increase play speed button, a decrease play speed button, a "jump-ahead" button for skipping ahead a given time in progress of the video stream, a "jump-back" button for skipping back a given time in progress of the video stream, etc. The displayed navigation controls include a video progress indicator, such as a stopwatch or clock showing the lapsed progress time of the video, a video timeline illustrating as a bar a progress of the video, etc. The video timeline may also provide a navigation capability, where dragging a slider appearing on the video timeline, across a video timeline, can result in advancing or moving back a progress of the video stream. Other navigation controls include, but are limited to, a bookmark function for adding a stamp for a time of interest in the video stream, a snapshot function for taking an image capture of the played video stream for saving an image of a video at a given time, etc.

The displaying of the navigation controls causes an overlaying of the selected video stream tile or of the displayed navigation controls over a video stream tile that is adjacent to the selected video stream tile.

In some instances, the selected video stream tile and the corresponding video stream tile may instead overlay two adjacent video stream tiles of the selected video stream tile. For instance, in an example where the video stream tiles occupy three rows, and selection input of a video stream tile appearing in a middle row is received, the selected video tile stream and/or the generated navigation controls may overlap with both the top and bottom video stream tiles that are adjacent to the selected video stream tile, where the overlap with each of the two adjacent video stream tiles is less (e.g. the half) of the overlap with one adjacent video stream tile if only a single adjacent video stream tile is overlapped.

For instance, when the displaying of the navigation controls causes a shift of the displayed navigation controls over a video stream tile adjacent to the selected video stream tile, the selected video stream tile may not, or at least be less, obstructed by its corresponding navigation controls. The displayed navigation controls instead at least partially obstruct the information provided by the adjacent video stream tile that has not been selected. For instance, reference is made to FIG. 5A. In this example, the top-left video stream tile has been selected. The displayed navigation controls 12 are displayed over the bottom video stream tile that has not been selected. Despite the displaying of the navigation controls, the video stream appearing in the selected video stream tile can be viewed by the user, unobstructed by the displayed navigation controls. In some instances, as shown in FIG. 5A, the displayed navigation controls, and/or the frame on which the displayed navigation controls are presented may be fully opaque, obscuring entirely the portion of the video stream tile laying under the displayed navigation controls. In other examples, as illustrated in FIG. 5B, the displayed navigation controls, and/or the frame on which the displayed navigation controls are presented may be semi-transparent, resulting in at least some of the portion of the video stream tile laying under the displayed navigation controls to be visible on the graphical user interface.

Figure 5B:
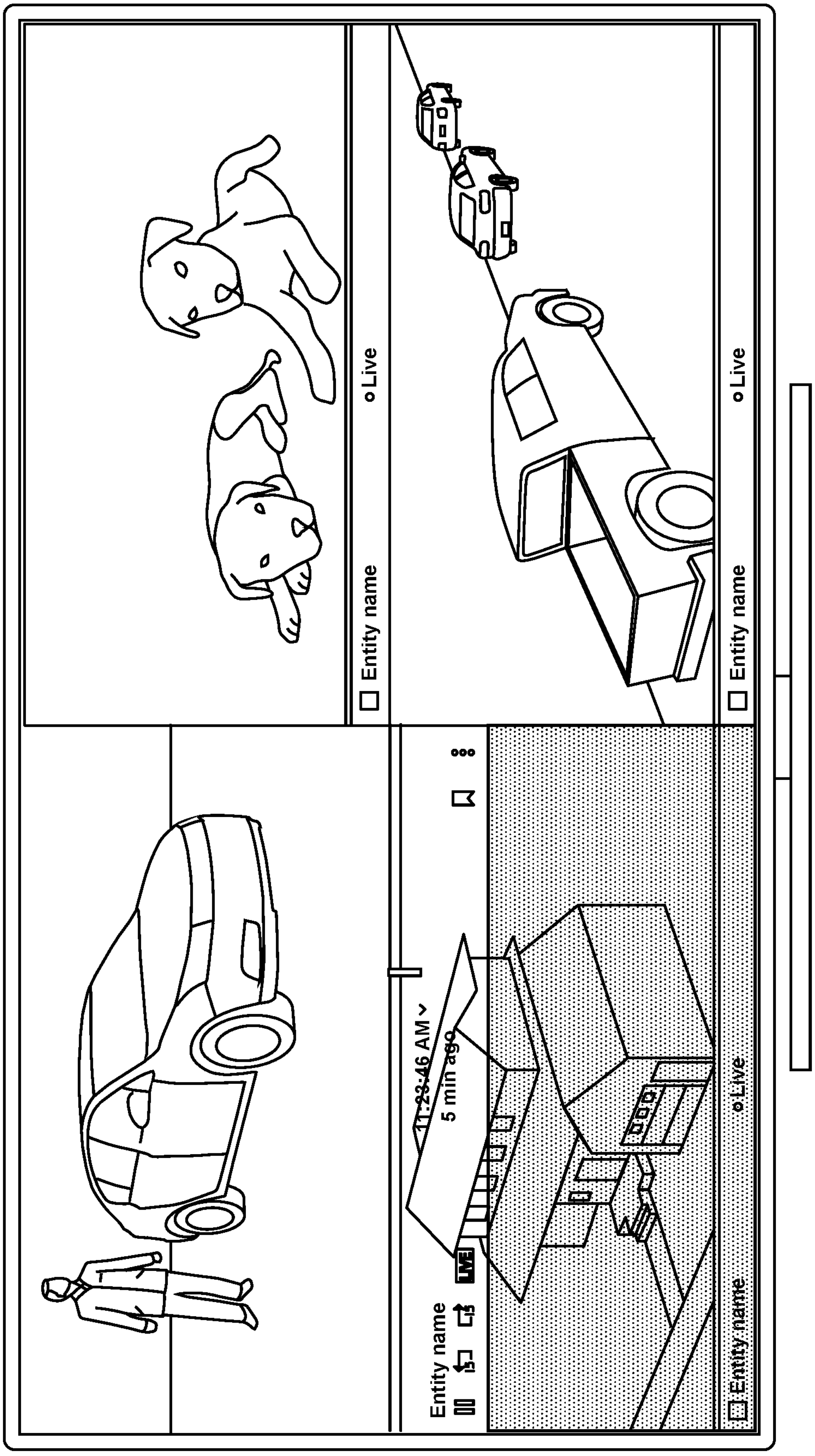
FIG. 5B is a drawing of an exemplary graphical user interface showing four video stream tiles, in an alternative second phase following the first phase illustrated in FIG. 4.
Figure 6:
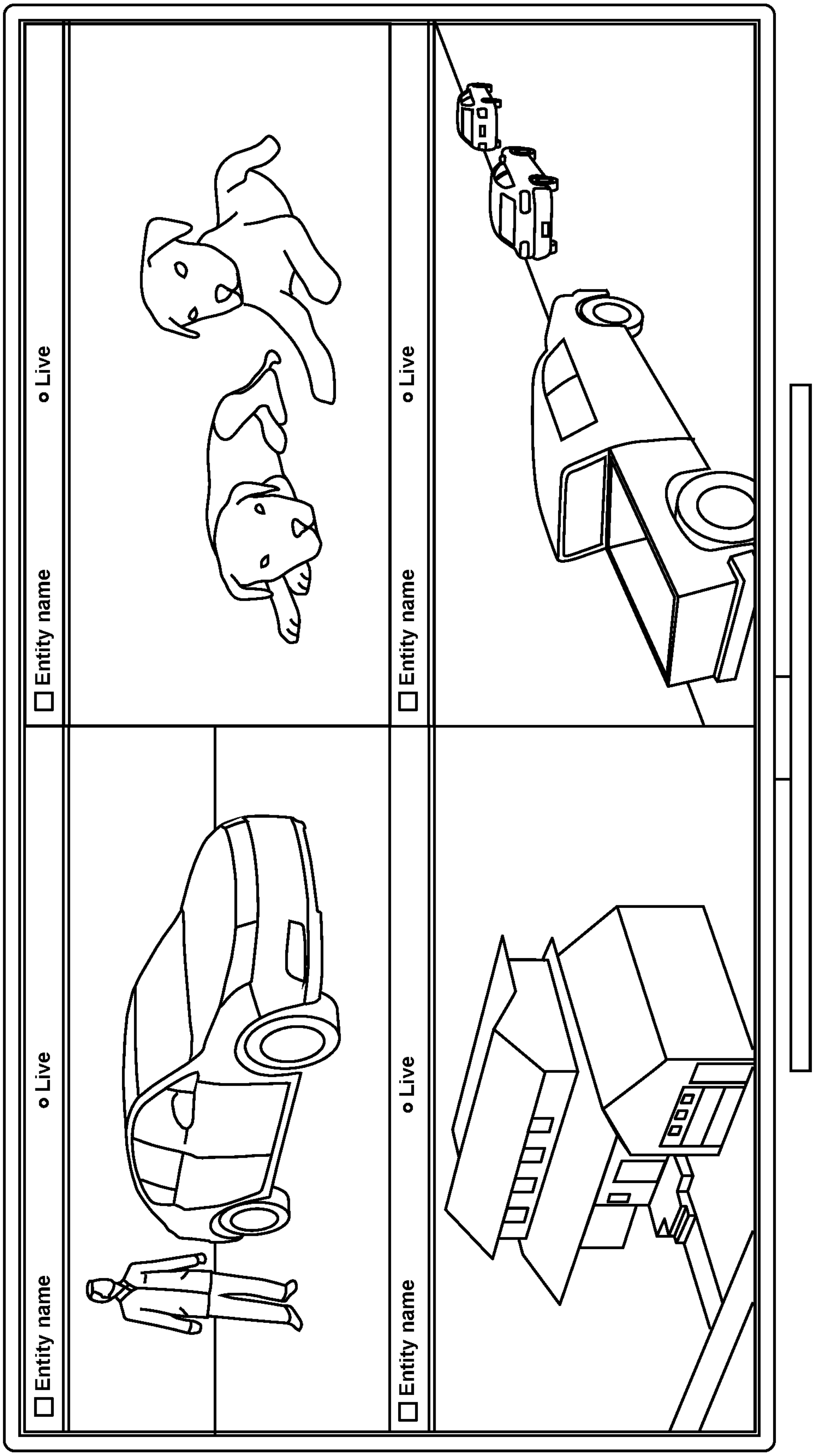
FIG. 6 is a drawing of an exemplary graphical user interface showing four video stream tiles, in a first phase.
Figure 7:
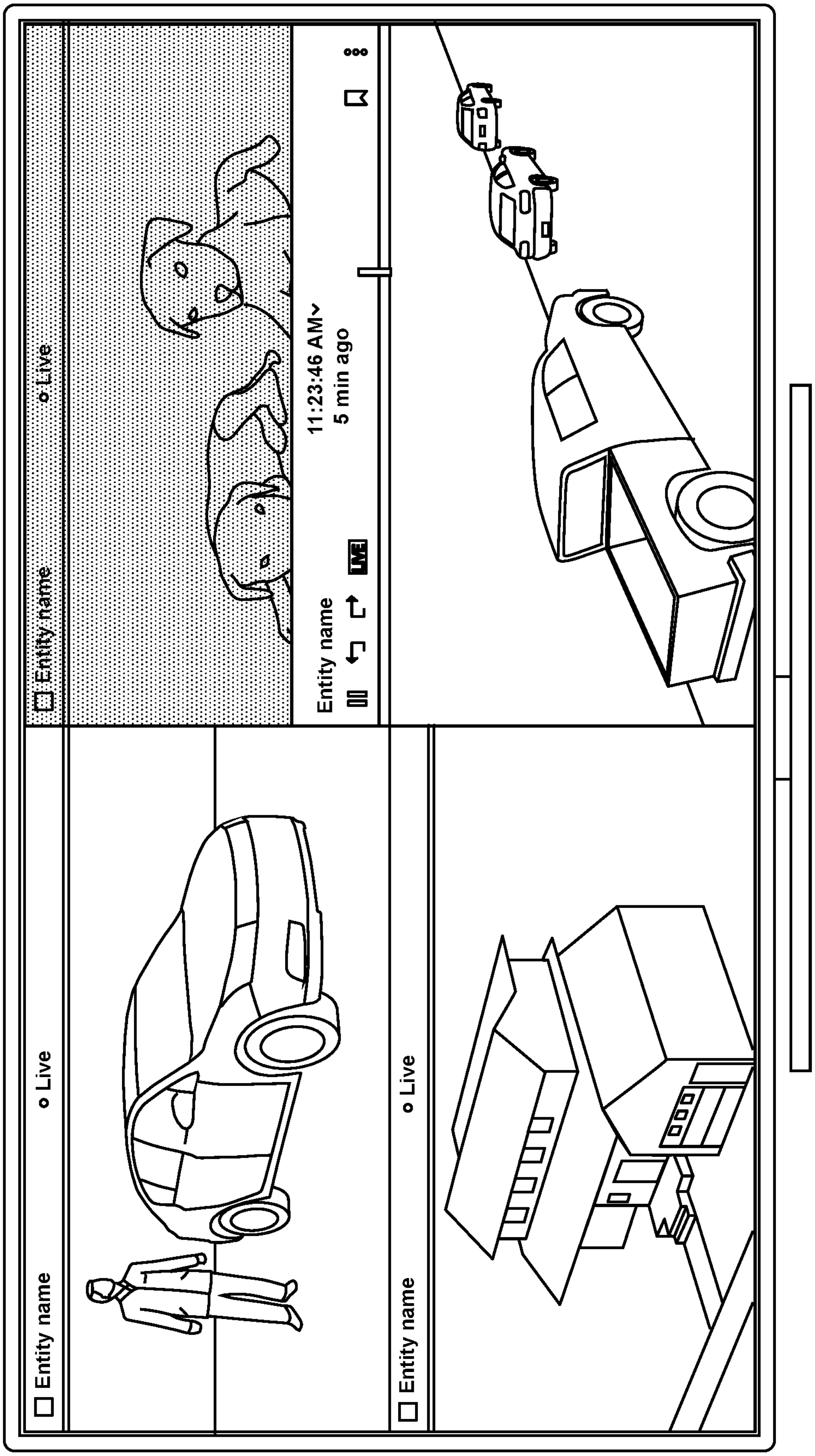
FIG. 7 is a drawing of an exemplary graphical user interface showing four video stream tiles, in a second phase following the first phase illustrated in FIG. 6.

It will also be understood that even though the examples shown in FIGS. 5A and 5B illustrate the navigation controls being displayed over a bottom video stream tile that is adjacent to the selected video stream tile, the displayed navigation controls may instead be displayed over a top adjacent video stream tile, as illustrated in FIG. 7 (showing a transition from the state illustrated in FIG. 6, from which the bottom-right video stream tile has been selected). In other embodiments, the navigation controls may instead overlay a right or left video stream tile that is adjacent to the selected video stream tile (not shown). The selection of the adjacent video stream tile with respect to which the navigation controls are displayed may depend on the position of the selected video stream tile with respect to the other video stream tiles of the two or more video stream tiles. The selection of the adjacent video stream tile with respect to which the navigation controls are displayed may depend on the location of the base navigation controls associated with each video stream tile, where the displayed navigation controls may add to the base navigation controls (where the base navigation controls may be positioned along a top, bottom, left or right side of the selected video stream tile).

In some instances, the navigation controls may be generated, i.e. where the appearance of the icon and the function of each navigation control is created and defined, prior to the display of the navigation controls on the graphical user interface. In some instances, the navigation controls are pre-generated with the graphical user interface, and the pre-generated navigation controls are then displayed when required, as described herein. In some instances, the navigation controls are generated once and then populate dynamically the graphical user interface, as required, for display of the navigation controls.

The selection of the adjacent video stream tile with respect to which the navigation controls are displayed may depend on additional configurations of the system, or input received by the user. For instance, the user may provide input that a video stream associated with a given video stream tile is to never be obscured by a selected video stream tile. In this example, the system may identify an adjacent video stream tile to the selected video stream tile that has not been identified by the user or by the system as one to not be obstructed by the navigation controls or video stream tile of the selected video stream tile.

In some implementations, the displaying of the navigation controls of the selected video stream may be first displayed over the selected video stream tile, and then, shifted over an adjacent video stream tile. The shifting of the navigation controls over an adjacent video stream tile may be performed automatically by the system following a lapse of a given period of time, or following the receipt of further user input for causing a shift of the navigation controls over the adjacent video stream tile (e.g. a button press of a mouse, a swipe of the mouse, etc. The selection input may be equivalent to one or more of those described with respect to step 1120).

In other embodiments, the navigation controls corresponding to the selected video stream tiles may be displayed over the adjacent video stream tile without first shifting from a position where the displayed navigation controls overlay the selected video stream tile.

In some embodiments, the selected video stream tile may instead overlay the adjacent video stream tile following or during the displaying of the navigation controls of the selected video stream tile. The navigation controls occupy a space that was previously occupied by at least part of the selected video stream tile prior to the displaying of the navigation controls of the selected video stream tile. The overlaying of the selected video stream also results in the displaying of the selected video stream tile and the corresponding navigation controls without the displayed navigation controls obstructing part of the selected video stream tile. Instead, information of an adjacent, unselected, video stream tile may be obstructed.

Figure 8:
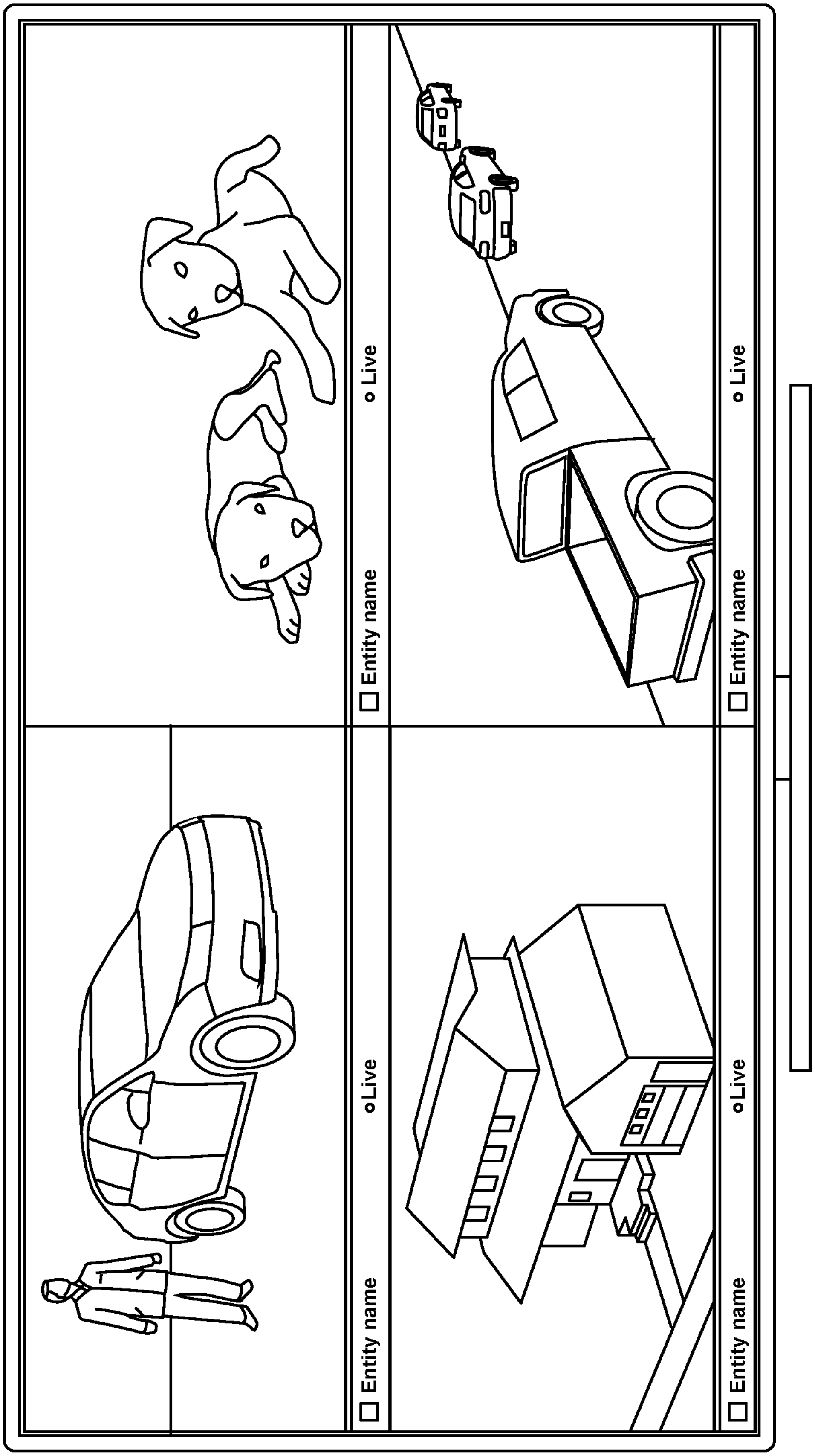
FIG. 8 is a drawing of an exemplary graphical user interface showing four video stream tiles, in a first phase.
Figure 9:
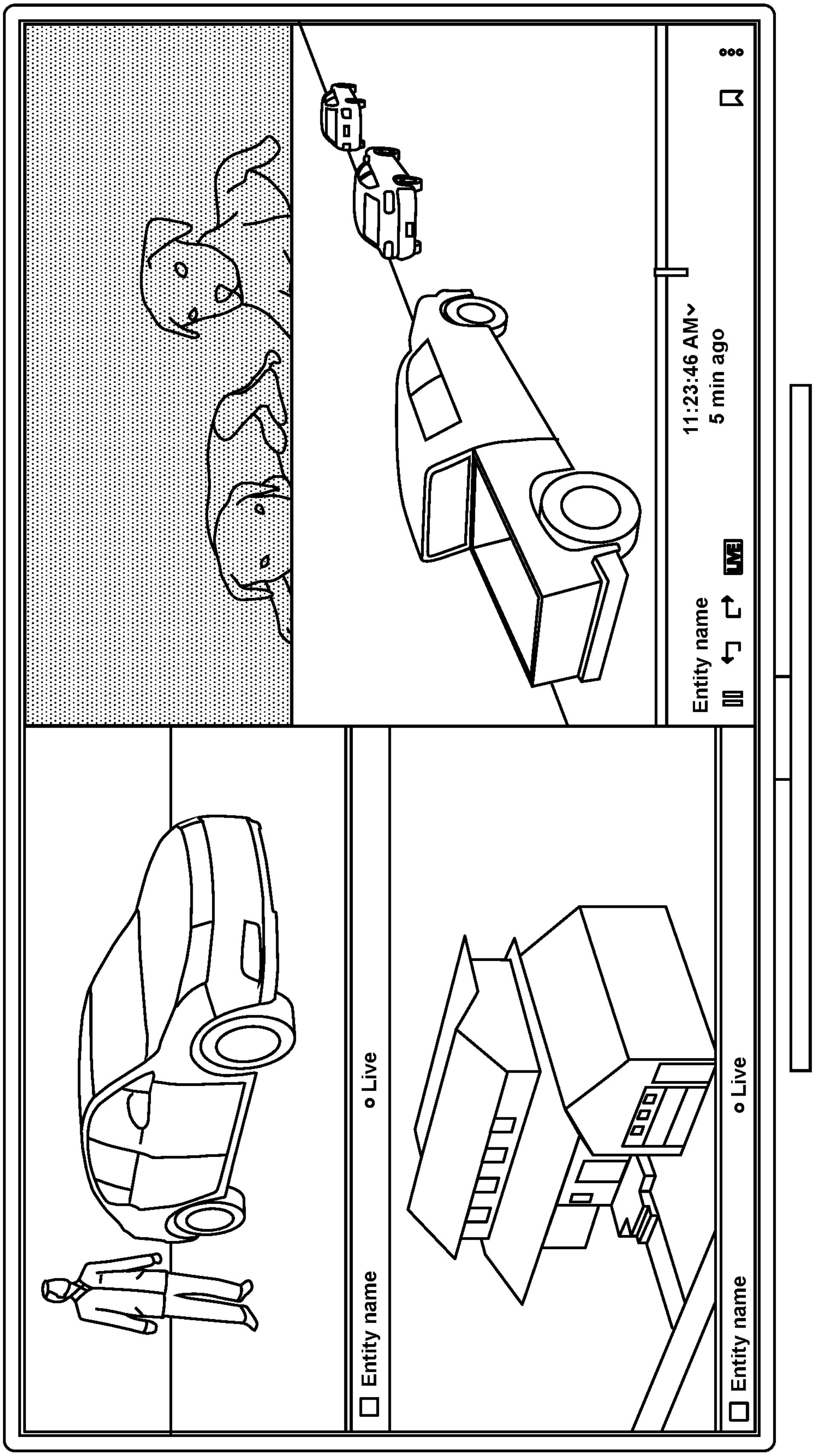
FIG. 9 is a drawing of an exemplary graphical user interface showing four video stream tiles, in a second phase following the first phase illustrated in FIG. 8.

For instance, reference is made to FIGS. 8 and 9. In this example, the bottom-right video stream tile of FIG. 8 has been selected. In one example, FIG. 9 illustrates a transition from the configuration of the graphical user interface illustrated in FIG. 8. The displayed navigation controls 12 are displayed at a bottom of the selected video stream tile, and the selected video stream is displaced upward, laid over the top-right video stream tile. Despite the displaying of the navigation controls, the video stream appearing in the selected video stream tile can be viewed by the user, unobstructed by the displayed navigation controls.

It will also be understood that even though the example shown in FIG. 9 illustrates the selected video stream tile shifting over an adjacent video stream tile positioned over the selected video stream tile, the selected video stream tile may instead overlay a bottom video stream tile, or a right or left video stream tile that is adjacent to the selected video stream tile (not shown). The determination of the adjacent video stream tile over which the selected video stream tile is overlaid may depend on the position of the selected video stream tile with respect to the other video stream tiles of the two or more video stream tiles. The determination of the adjacent video stream tile over which the selected video stream tile is overlaid may depend on the location of the base navigation controls associated with each video stream tile, where the displayed navigation controls may add to the base navigation controls (where the base navigation controls may be positioned along a top, bottom, left or right side of the selected video stream tile). The determination of the adjacent video stream tile over which the selected video stream tile is overlaid may depend on additional configurations of the system, or input received by the user. For instance, the user may provide an input that a video stream associated with a given video stream tile is to never be obscured by a selected video stream tile. In this example, the system determines an adjacent video stream tile to the selected video stream tile that has not been identified by the user or the system as one to not be obstructed by the selected video stream tile following the display of the navigation controls.

In some implementations, the displaying of the navigation controls of the selected video stream may be first displayed over the selected video stream tile, and then, the selected video stream tile is shifted over an adjacent video stream. The shifting of the selected video stream tile over an adjacent video stream tile may be performed automatically by the system following a lapse of a given period of time, or following the receipt of further user input for causing a shift of the selected video stream tile over the adjacent video stream tile (e.g. a button press of a mouse, a swipe of the mouse, etc. The selection input may be equivalent to one or more of those described with respect to step 1120).

In other embodiments, the selected video stream tile may be displayed over the adjacent video stream tile upon displaying of the corresponding navigation controls without first shifting from a position where the displayed navigation controls overlay the selected video stream tile.

The user may then view the selected video stream tile concurrently with its corresponding navigation controls, unobstructed or at least less obstructed by the displayed navigation controls than if the navigation controls were entirely overlayed over the selected video stream tile.

In some embodiments, further user input may be received for causing the navigation controls to remove the displayed navigation controls at step 1140. The user input may be provided using one or more I/O devices, such as a mouse, a touchscreen, a keyboard, a microphone, a motion sensor, etc. The user input may include, but is not limited to, a button-press of a mouse (e.g. where a button press of the selected video stream tile may trigger the removal of the displayed navigation controls), a button-press of a keyboard, a press on a touchscreen, a voice command captured by a microphone, a motion captured by a motion sensor leading to a selection of a video stream tile, eye motion captured by a vision tracker directed towards the selected video stream tile, or a combination thereof. In some instances, the user input may be moving a cursor away, or hovering away from, the selected video stream tile (that will cause the removal of the navigation controls of the selected video stream tile).

In some instances, the removal of the displayed navigation controls may not be triggered by user input, but instead by the meeting of another condition or event. For instance, the displayed navigation controls may be removed instead following a lapse of a given time period following the displaying of the same navigation controls. In some embodiments, the displayed navigation controls may be removed following a selection of a different video stream tile of the two or more video stream tiles for displaying navigation controls for the different selected video stream tile. The selection of the different video stream tile may cause the removal of the navigation controls for the initially selected video stream tile, and the displaying of the navigation controls for the different selected video stream tile.

The displayed navigation controls, corresponding to the selected video stream tile, are removed from the graphical user interface at step 1150.

In some instances where the navigation controls are overlayed over an adjacent video stream tile of the selected video stream tile, the removal of the displayed navigation controls results in the adjacent video stream tile being no longer obstructed by the selected video stream tile.

The removal of the navigation controls may be a gradual collapse or receding of the navigation controls into the selected video stream tile. In some embodiment, the removal of the navigation controls may be a fade out of the navigation controls, as the transparency of the navigation controls gradually increases until the displayed navigation controls are no longer visible. It will be appreciated that the removal of the navigation controls may be depicted on the graphical user interface in multiple manners (such as simply the disappearance of the displayed navigation controls) using other animations or effects, provided the adjacent video stream tile is no longer obstructed by the displayed navigation controls following the removal of the displayed navigation controls.

In some instances where the displayed navigation controls caused an overlay of at least a part of the selected video stream tile over an adjacent video stream tile of the selected video stream tile, the removal of the navigation control results in the selected video stream tile returning to an initial position, i.e., a position assumed by the selected video stream tile prior to the displaying of the navigation controls, resulting in the adjacent video stream tile no longer being obstructed by the selected video stream tile.

The return of the selected video stream tile to an initial position may be performed as a gradual translation from a current position, where the selected video stream tile overlayed on the adjacent video stream tile gradually shifts back to its initial position, prior to the displaying of the navigation controls.

The return of the selected video stream tile to the initial position may be instantaneous, or performed over time, and in some cases, in synchronicity with the removal of the navigation controls. It will be appreciated that the return of the selected video stream tile to an initial position may be performed on the graphical user interface in multiple manners, provided the adjacent video stream tile is no longer obstructed by the selected video stream tile controls following the return of the selected video stream tile to its initial position prior to the displaying of the navigation controls.

In some embodiments, multiple video stream tiles may be selected concurrently, where navigation controls for each of the selected video stream tiles are displayed. The determination of which adjacent video stream tile that will be at least partially obscured following the displaying of the navigation controls may be dependent on the layout of the plurality of video stream tiles and the position of the selected video stream tiles, where the displaying of the navigation controls results in a configuration displayed on the graphical user interface where the selected video stream tiles are not obstructed by displayed navigation controls.

It will be understood that the present systems and methods are not limited to video surveillance. For instance, the present systems and methods may be used in the context of esports, where videos from a number of player perspectives (e.g. captured through webcams) or games (e.g. through screen sharing) are shown concurrently. In another example, the present systems and methods may be used for video analysis or video editing, where a number of video streams to be edited are shown concurrently in the video stream tiles, etc.

Figure 2:
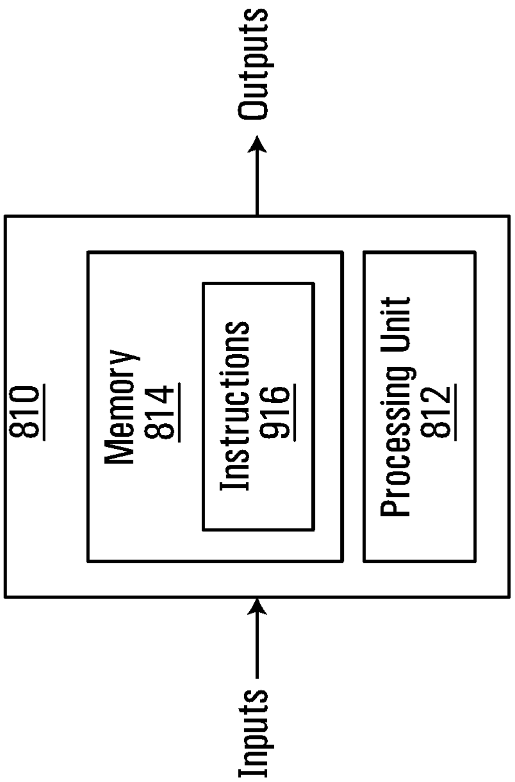
FIG. 2 is a block diagram of an exemplary computing device.

With reference to FIG. 2, the methods of the present disclosure may be implemented by one or more computing devices, such as a computing device 810 comprising a processing unit 812 and a memory 814 which has stored therein computer-executable instructions 916. Each of the system 100 and the client device 130 may each be implemented by and/or comprise at least one computing device, such as the computing device 810.

The processing unit 812 may comprise any suitable devices configured to implement the methods such that instructions 816, when executed by the computing device 130 or other as described herein to be executed. The processing unit 812 may comprise, for example, any type of general-purpose microprocessor or microcontroller, a digital signal processing (DSP) processor, a central processing unit (CPU), a graphical processing unit (GPU), an integrated circuit, a field programmable gate array (FPGA), a reconfigurable processor, other suitably programmed or programmable logic circuits, or any combination thereof. The processing unit 712 may be referred to as a "processor".

The memory 814 may comprise any suitable known or other machine-readable storage medium. The memory 814 may comprise non-transitory computer readable storage medium, for example, but not limited to, an electronic, magnetic, optical, electromagnetic, infrared, or semiconductor-based system, apparatus, or device, or any suitable combination of the foregoing. The memory 814 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 814 may include any storage means (e.g., devices) suitable for retrievably storing machine-readable instructions 816 executable by processing unit 812.

The methods and systems described herein may be implemented in a high-level procedural or object-oriented programming or scripting language, or a combination thereof, to communicate with or assist in the operation of a computer system, for example the computing device 810. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or in some embodiments the processing unit 812 of the computing device 810, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

What is claimed is:

1. A method for display of video stream navigation controls and video stream tiles on a graphical user interface, the method comprising:

rendering, on a display device of a computing device, a graphical user interface with two or more video stream tiles, each of the two or more video stream tiles adapted to display a video stream comprising a plurality of image frames;

receiving, at the computing device, input for selecting a first video stream tile of the two or more video stream tiles, the first video stream tile having displayed therein a first video stream; and displaying, by the computing device on the graphical user interface, navigation controls for controlling the display of the first video stream of the first video stream tile based on receiving the input for selecting the first video stream tile, the navigation controls at least in part overlapping a second video stream tile of the two or more video stream tiles that is adjacent to the first video stream tile, the second video stream tile having displayed therein a second video stream.

2. The method as defined in claim 1, wherein the navigation controls that at least in part overlap the second video stream tile are at least in part transparent to allow for the second video stream of the second video stream tile to at least in part be visible within the navigation controls.

3. The method as defined in claim 2, wherein the navigation controls that at least in part overlap the second video stream tile are opaque to obscure a portion of the second video stream of the second video stream tile overlapped by the navigation controls.

4. The method as defined in claim 1, wherein the navigation controls that at least in part overlap the second video stream tile include a video timeline that overlaps the second video stream tile.

5. The method as defined in claim 1, wherein the first video stream tile is positioned above the second video stream tile, and wherein the navigation controls overlap a top portion of the second video stream tile without obstructing the first video stream displayed within the first video stream tile.

6. The method as defined in claim 1, wherein the first video stream tile is positioned below the second video stream tile, and wherein the navigation controls overlap a bottom portion of the second video stream tile without obstructing the first video stream displayed within the first video stream tile.

7. The method as defined in claim 1, wherein the input includes hovering over the first video stream tile with a cursor of an input device.

8. The method as defined in claim 1, wherein the input includes a button press selection of the first video stream tile via an input device.

9. The method as defined in claim 1, wherein the video stream of each of the two or more video stream tiles corresponds to a respective video stream generated by a respective surveillance camera.

10. The method as defined in claim 1, wherein displaying the navigation controls comprises:

overlaying the navigation controls over a portion of the first video stream tile; and shifting the navigation controls to the second stream tile to unobstruct the portion of the first video stream tile.

11. The method as defined in claim 10, wherein overlaying the navigation controls occurs when the input includes hovering over the first video stream tile with a cursor of an input device and wherein shifting the navigation controls occurs when the input includes a button press selection of the first video stream tile with the input device.

12. The method as defined in claim 1, wherein the input is a first input, and wherein the method further comprises:

receiving a second input, at the computing device, to unselect the first video stream tile; and removing, by the computing device on the graphical user interface, the navigation controls that at least in part overlap the second video stream tile from overlapping the second video stream tile when the second input is received.

13. The method as defined in claim 1, wherein the first video stream tile and the second video stream tile are touching.

14. The method as defined in claim 1, wherein each of the two or more video stream tiles comprises base navigation controls, and wherein the navigation controls that are displayed add to the base navigation controls of the first video stream tile.

15. The method as defined in claim 1, wherein the two or more video stream tiles comprises at least four video stream tiles arranged in a matrix of video stream tiles.

16. A method for display of video stream navigation controls and video stream tiles on a graphical user interface, the method comprising:

rendering, on a display device of a computing device, a graphical user interface with two or more video stream tiles, each of the two or more video stream tiles adapted to display a video stream comprising a plurality of image frames;

receiving, at the computing device, input for selecting a first video stream tile of the two or more video stream tiles, the first video stream tile having displayed within a first video stream;

displaying, by the computing device on the graphical user interface, navigation controls for controlling the display of the first video stream of the first video stream tile based on receiving the input for selecting the first video stream tile; and displacing the first video stream tile to at least in part overlap a second video stream tile of the two or more video stream tiles that is adjacent to the first video stream tile, the second video stream tile having displayed within a second video stream, said displacing resulting in the navigation controls being displayed within a region of the graphical user interface previously occupied by the first video stream.

17. The method as defined in claim 16, wherein the first video stream tile is positioned below the second video stream tile, and wherein the first video stream tile overlaps a bottom portion of the second video stream tile following said displaying of the navigation controls, the navigation controls displayed over a bottom of the first video stream tile.

18. The method as defined in claim 16, wherein the first video stream tile is positioned above the second video stream tile, and wherein the first video stream tile overlaps a top portion of the second video stream tile following said displaying of the navigation controls, the navigation controls displayed next to a top of the first video stream tile.

19. The method as defined in claim 18, wherein the navigation controls include a video timeline.

20. The method as defined in claim 16, wherein the input includes hovering over the first video stream tile with a cursor of an input device.

21. The method as defined in claim 16, wherein the input includes a button press selection of the first video stream tile via an input device.

22. The method as defined in claim 16, wherein the video stream of each of the two or more video stream tiles corresponds to a respective video stream generated by a respective surveillance camera.

23. The method as defined in claim 16, wherein displaying the navigation controls comprises:

overlaying the navigation controls over a portion of the first video stream tile; and shifting the first video stream tile over the second stream tile, the first video stream tile unobstructed by the navigation controls.

24. The method as defined in claim 23, wherein overlaying the navigation controls occurs when the input includes hovering over the first video stream tile with a cursor of an input device and wherein shifting the navigation controls occurs when the input includes a button press selection of the first video stream tile with the input device.

25. The method as defined in claim 16, wherein the input is a first input, and wherein the method further comprises:

receiving a second input, at the computing device, to unselect the first video stream tile; and removing, by the computing device on the graphical user interface, the navigation controls; and shifting the first video stream tile to unobstruct the second video stream tile.

26. The method as defined in claim 16, wherein the first video stream tile and the second video stream tile are touching.

27. The method as defined in claim 16, wherein each of the two or more video stream tiles comprises base navigation controls, and wherein the navigation controls that are displayed add to the base navigation controls of the first video stream tile.

28. The method as defined in claim 16, wherein the two or more video stream tiles comprises at least four video stream tiles arranged in a matrix of video stream tiles.

* * * * *